(12) United States Patent
Wallace et al.

(10) Patent No.: US 10,848,533 B2
(45) Date of Patent: Nov. 24, 2020

(54) REMOTELY CONFIGURABLE WIRELESS BROADCAST DEVICE

(71) Applicant: Radius Networks Inc., Washington, DC (US)

(72) Inventors: Marc Wallace, Arlington, VA (US); Christopher Sexton, McLean, VA (US); David Helms, Arlington, VA (US); David Young, Washington, DC (US)

(73) Assignee: RADIUS NETWORKS INC., Washington, DC (US)

( * ) Notice: Subject to any disclaimer, the term of this patent is extended or adjusted under 35 U.S.C. 154(b) by 0 days.

(21) Appl. No.: 14/693,291

(22) Filed: Apr. 22, 2015

(65) Prior Publication Data
US 2016/0315982 A1    Oct. 27, 2016

(51) Int. Cl.
| | |
|---|---|
| *H04L 29/06* | (2006.01) |
| *H04W 8/00* | (2009.01) |
| *H04W 4/80* | (2018.01) |
| *H04L 29/08* | (2006.01) |
| *H04L 12/24* | (2006.01) |
| *H04W 4/06* | (2009.01) |
| *H04L 12/26* | (2006.01) |

(52) U.S. Cl.
CPC ...... *H04L 65/4076* (2013.01); *H04L 41/0816* (2013.01); *H04L 41/0853* (2013.01); *H04L 67/125* (2013.01); *H04W 4/80* (2018.02); *H04W 8/005* (2013.01); *H04L 41/046* (2013.01); *H04L 43/0811* (2013.01); *H04L 43/0817* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 2002/0176388 A1 | 11/2002 | Paul et al. | |
| 2010/0299639 A1* | 11/2010 | Ramsay | ............... G06F 3/0486 715/835 |
| 2011/0019621 A1 | 1/2011 | Karsten et al. | |

(Continued)

OTHER PUBLICATIONS

International Preliminary Report, dated Oct. 24, 2017, in International Patent No. PCT/US2016/023599, 12 pages.

*Primary Examiner* — Chi H Pham
*Assistant Examiner* — Raul Rivas
(74) *Attorney, Agent, or Firm* — Vierra Magen Marcus LLP

(57) ABSTRACT

The system and method of the present disclosure relates to a remotely configurable wireless broadcast device connected to a network. The device includes a network connected computer and a proxy that interfaces with one or more non-network connected broadcast devices. The wireless broadcast device monitors the non-network connected broadcast devices and periodically reports the status for each of the devices. A server, remotely located from the configurable wireless broadcast device, receives and processes the status reports. The status reports may also be monitored by a user via a common user interface connected to the server. After processing the status reports, the server sends configuration data, including updated or modified information, back to the wireless broadcast device instructing the device to configure the non-network connected devices.

20 Claims, 10 Drawing Sheets

(56) References Cited

U.S. PATENT DOCUMENTS

2012/0294234 A1   11/2012  Stillman et al.
2013/0125107 A1*  5/2013  Bandakka ........... G06F 11/1417
                                                              717/171
2014/0270235 A1*  9/2014  Shin ....................... H04R 27/00
                                                               381/77

\* cited by examiner

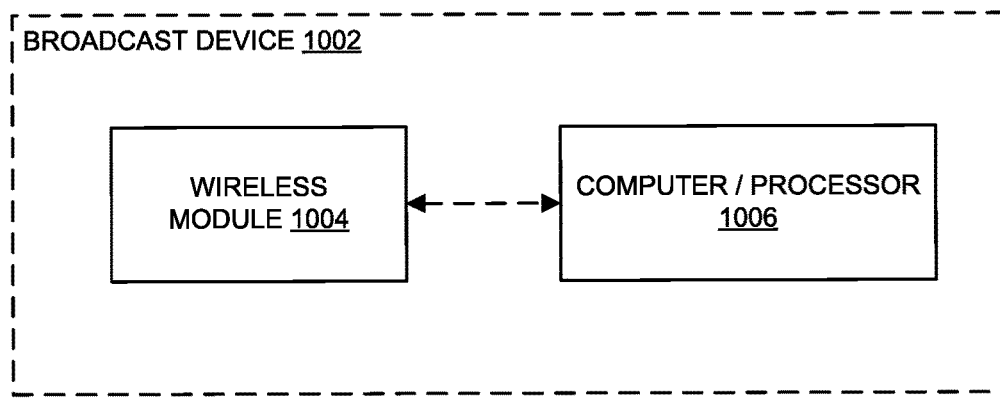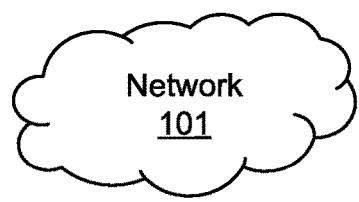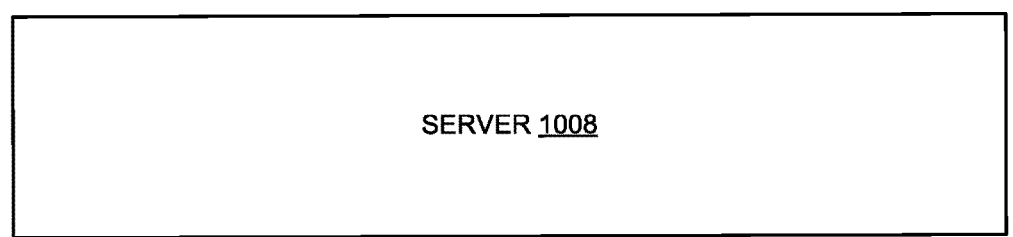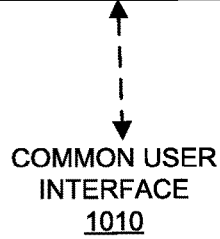
FIG. 1

REMOTELY CONFIGURABLE WIRELESS BROADCAST DEVICE

BACKGROUND

Short-range wireless proximity broadcast devices typically involve devices with a communications range of less than several hundred feet. These devices are typically employed in a location of business such that consumers entering the business may be provided with information by the business, for example, to a consumer's wireless device. These broadcast devices are also used by consumers, businesses, service organizations (among others) to establish or extend local area networks to locations that are not readily or desirably connected to wire network interface cards. However, as these broadcast devices are not network connected, it requires a person to physically access the broadcast device to perform any maintenance or updates. This may be particularly onerous in situations where the broadcast devices are positioned in difficult to reach locations or too many devices are deployed at a specific location.

BRIEF SUMMARY

The present disclosure, generally described, relates to technology for remotely configuring a broadcast device, and in particular, to technology for configuring a non-network connected broadcast device from a remotely located server.

More specifically, the system and method of the present disclosure relates to a remotely configurable wireless broadcast device connected to a network. The device includes a network connected computer and a proxy that interfaces with one or more non-network connected broadcast devices. The wireless broadcast device monitors the non-network connected broadcast devices and periodically reports the status for each of the devices. A server, remotely located from the configurable wireless broadcast device, receives and processes the status reports. The status reports may also be monitored by a user via a common user interface connected to the server. Additionally or alternatively, the wireless broadcast device connected to the network may send a request for instructions to the server, requesting any new or updated configuration data available at the server for updating the non-network connected broadcast device. After processing the status reports or request for instructions, the server sends configuration data, including updated or modified information, back to the wireless broadcast device instructing the device to configure the non-network connected devices. The ability to remotely configure a non-network connected broadcast device via a wireless broadcast device not only provides remote capability, but it also provides an added level of security since the non-network connected broadcast devices may be monitored and updated as necessary.

The wireless broadcast device connected to the network includes, for example, a proxy having an agent, an update module, a configuration module, a status module, a server API client and adapters. The proxy, in conjunction with the agent and adapters, interfaces and communicates with non-network connected broadcast devices (e.g., beacons) to provide an indirect pathway via a network to a server that provides updated information to the beacons. The update module and configuration module are configured to receive and store configuration data, respectively, from the server. The status module monitors and identifies configuration changes in the beacons and/or determines when updated information is available for download in at the server. When updated information is available at the server, it is downloaded to the wireless broadcast device and the proxy controls and manages the beacons such that the updated information is provided thereto.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

FIG. 1 is an exemplary diagram illustrating a system to remotely configure a wireless broadcast device in accordance with one embodiment.

DETAILED DESCRIPTION

Figure 2:
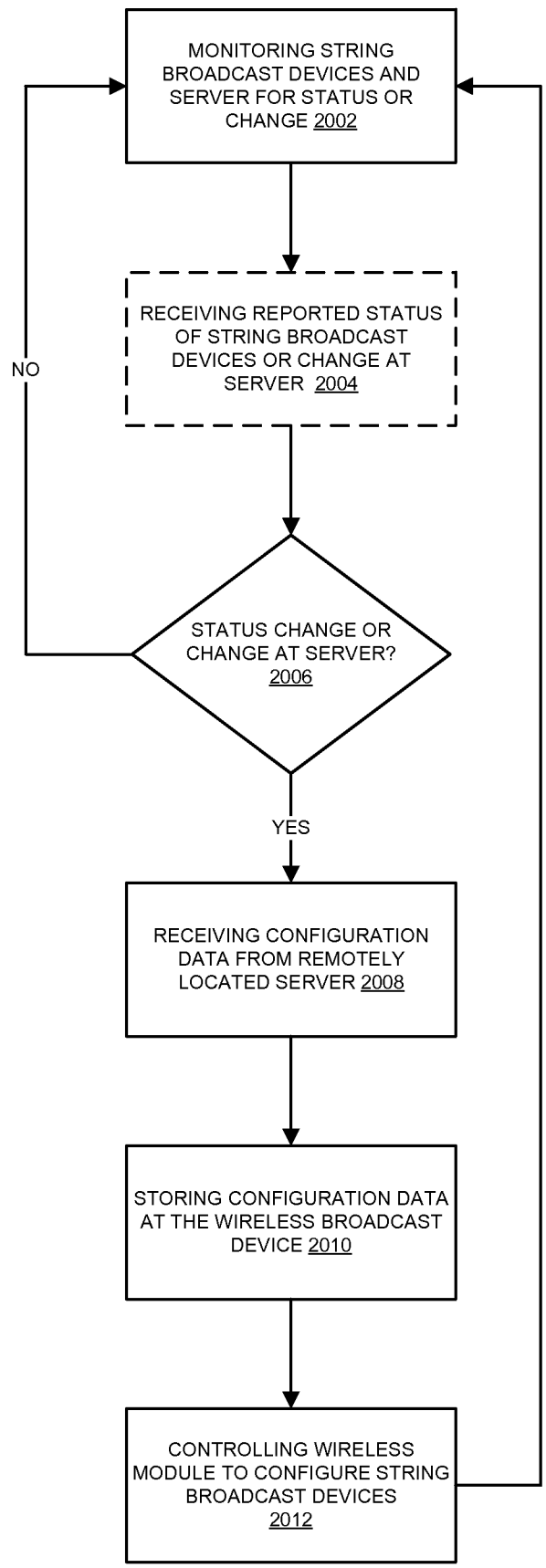
FIG. 2 is an exemplary flow diagram of monitoring and remotely configuring a broadcast device.

The present disclosure, generally described, relates to technology for remotely configuring a broadcast device, and in particular, to technology for configuring a non-network connected broadcast device from a remotely located server.

FIG. 1 is an exemplary diagram illustrating a system to remotely configure a wireless broadcast device in accordance with one embodiment. The system 1000 includes, for example, a broadcast device 1002, a server 1008 and a wireless device or station 202 operable by a user. The broadcast device 1002 includes, for example a wireless module 1004 and a computer (or processor) 1006. The computer or processor 1006 is any well-known computer, such as a Zotac, Raspberry Pi or Gateworks with Open WRT, with network connectivity. (It is appreciated that the computer and/or processor are not limited to such described embodiments). The broadcast device 1002 (also referred to herein as a wireless broadcast device) is remotely managed (or configurable) by the server 1008, which may be connected to network 101 via computer 1006. Thus, the broadcast device 1002 may be controlled remotely from any geographical location over network 101. Network 101 may be any network as readily understood, including but not limited to, any public or private network, or a combination of public and private networks such as the Internet, and/or a public switched telephone network (PSTN), or any other type of network that provides the ability for communication between computing resources, components, users, etc. The server 1008, in one embodiment, may be accessed and controlled by a user operating a common user interface 1010, such as a web interface that enables a user to provide instructions to and program the server 1008. That is, a user may operate the common user interface 1010 to instruct and configure information in the server 1008. Information stored in the server 1008 includes, for example, settings and status information (collectively known as configuration data) applicable for programming, updating and configuring broadcast device 1002. The server 1008 may also include or connect to one or more storage devices or systems (not shown) that store the settings, status and configuration data. It is appreciated that any common user interface may be used, and the interface is not limited to the described embodiment.

The broadcast device 1002 includes, for example, a wireless module 1004 and computer and/or processor 1006, which are communicatively coupled. In one embodiment, the broadcast device 1002 is configured as a wireless proximity broadcast device or beacon that has a network connection (for example, a network connection to network 101) enabling remote management or configuration from an externally connected device or component, such as server 1008. Thus, an externally connected device or component, such as server 1008, may not only access (or read) information from the broadcast device 1002 but it may also program (or write) to the broadcast device 1002. The wireless module 1004 (which may comprise one or more modules), as will be described in more detail below with reference to FIGS. 8 and 9, may include one or more wired or wireless interfaces (despite its "wireless" name), such as a USB interface or a Bluetooth BLE module or any other wireless interface technology. The interface provides a connection to one or more wireless broadcast devices, such as string broadcast station (device) 220 (FIGS. 5 and 6), that is not network connected. That is, as described below, the wireless broadcast device 220 has wired or short range wireless capability (capable of communicating with devices wirelessly in proximity) for broadcasting messages using, for example, digital radio packet advertisements. However, the wireless broadcast device 220 does not have a network connection that provides for long range communication. Alternatively, the wireless module 1004 may include one or more of the wireless broadcast devices 220 that are communicatively coupled to the computer or processor 1006. The broadcast device 1002 and the server 1008 will be described in more detail below with reference to the various figures.

FIG. 2 is an exemplary flow diagram of monitoring and remotely configuring a broadcast device. The process depicted in FIG. 2 describes the broadcast device 1002 monitoring and controlling (or managing) one or more wireless broadcast devices 220 (also referred to herein as a string broadcast station or device). The process provides a user at a common user interface 1010 to monitor and configure (i.e., manage) string broadcast devices 220, via server 1008, from a remote geographic location. For example, the user may configure settings of the string broadcast station 220 to turn on/off, change broadcast identifiers, increase or decrease transmission power levels, change advertising frequencies and modify the measured power calibration constant. Thus, a user may remotely update or upgrade software and firmware on the non-network connected string broadcast station 220 and without having to be physically located at the site of the non-network connected device. Similarly, the user may monitor the status of the string broadcast devices 220, as described herein below. Additionally, even when a user may be in relatively close proximity to the string broadcast devices 220, it may be unrealistic to manually program or update the devices. For example, a corporate headquarter building may have hundreds or thousands of string broadcast devices 220 that require updates on a daily basis. Implementation of such an effort would not be practical without the system described herein.

The computer 1006 (via the wireless module 1004) monitors the one or more string broadcast stations 220 to determine a respective status of each connected device and/or monitors the server 1008 to determine whether an update (change) is ready at 2002. The status of each connected string broadcast device 220 is optionally reported by the computer 1006 to the server 1008, or alternatively the server 1008 reports that an update is ready to the computer 1006 at 2004. The status of a connected device includes, in the simplest form, whether a device is powered ON or OFF (e.g., an UP or DOWN status of the device). More complex status reports may also be included to report any information about one or more of the string broadcast devices 220. For example, in a non-limiting embodiment, the status may also include information about the broadcast identifiers (e.g., SSID), transmission power level, advertising frequency (e.g., Bluetooth advertising), etc. The status may be reviewed or processed at either the computer 1006 of the broadcast device 1002 or at the server 1008 to determine the "health" of the any device reporting a status. It is appreciated that the string broadcast devices 220 may report a status as a group or individually, and may provide such status on a regular or random interval or at any time designated in the settings of an individual device (and remotely configurable). Similarly, any updates reported by the server 1008 to the computer 1006 may provide information (configuration data) about the on/off status, broadcast identifiers, transmission power level, advertising frequency, etc.

If no change in status of a string broadcast device 220 or at the server 1008 is detected at 2006 by the computer 1006 (or sever 1008), the computer 1006 continues to monitor the status of each string broadcast device 220 and the sever 1008 at 2002. If, on the other hand, a change in status of the broadcast device 220 is detected by the computer 1006 (or server 1008), then the process continues to 2008. Similarly, if a change is detected at the server 1008, then the process continues to 2008. At 2008, and in response to a determined change in status at 2006, the broadcast device 1002 receives configuration data from the server 1008 which is located remotely and communicatively coupled to network 101 (FIG. 1). The configuration data, as described above, may include setting and/or status information about each device. It is also appreciated that although the depicted embodiment receives configuration data when a status changes, the disclosure is not limited to such an embodiment. For example, configuration data may be provided to update, manage, control or change a device at any time regardless of whether a change in status has occurred at any particular device. At 2010, the received configuration data 2010 may be stored locally in a memory or storage device of the broadcast device 1002 and the computer 1006 instructs the wireless module 1004 to configure one or more of the string broadcast stations 220 with the corresponding configuration data, at 2012. Upon completion of configuring the one or more string broadcast devices 220, the process continues back to monitoring the devices at 2002. A more detailed description of the broadcast device 1002, wireless module 1004 and computer 1006 will be described below with reference to FIGS. 8 and 9. It is also appreciated that the processing may be performed at the wireless broadcast device 1002 or at the server 1008, or a combination therefor.

Figure 3:
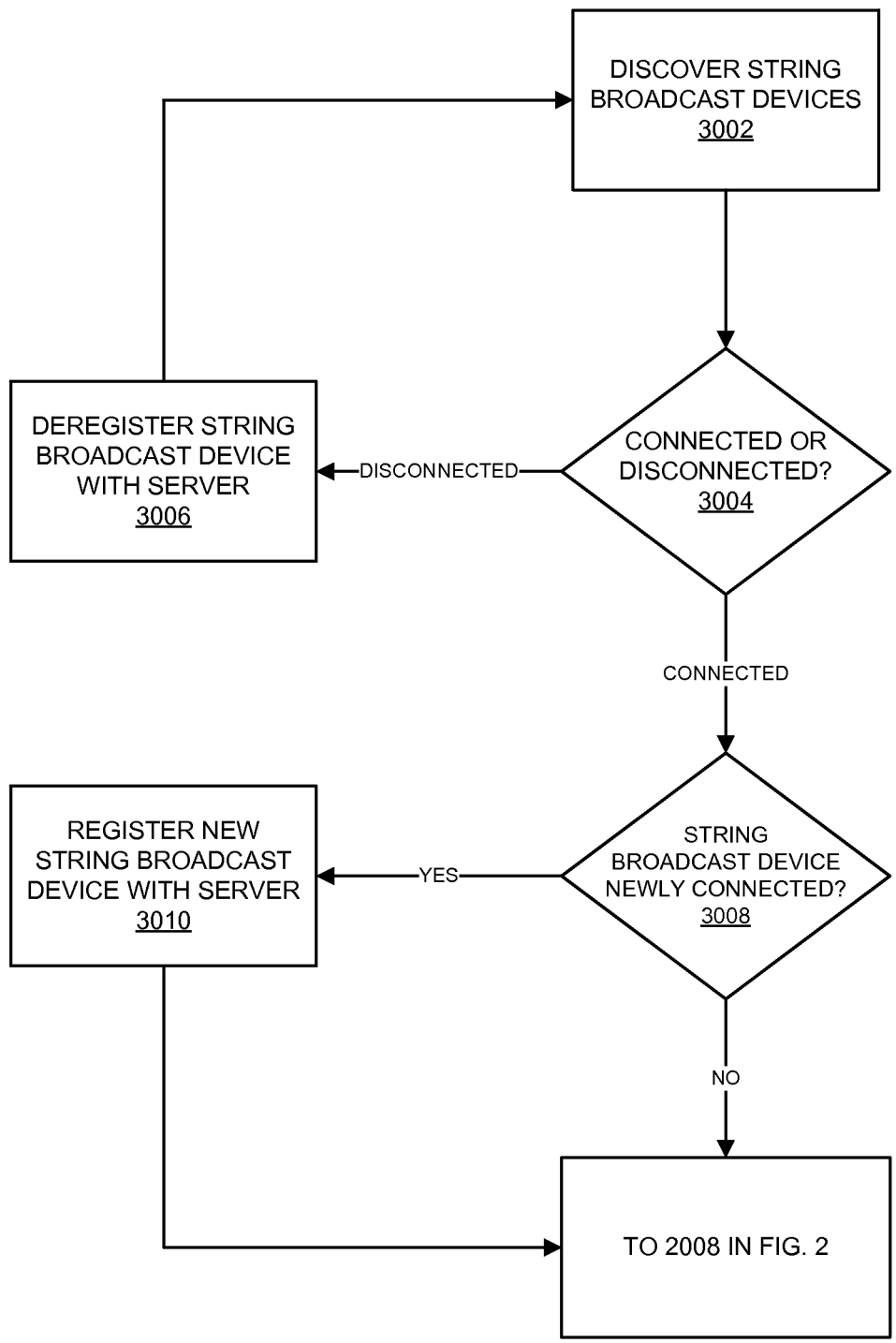
FIG. 3 is an exemplary flow diagram of discovering connected and disconnected broadcast devices.

FIG. 3 is an exemplary flow diagram of discovering connected and disconnected broadcast devices. In addition to monitoring the string broadcast devices 220 as described with reference to FIG. 2, the system also monitors for newly connected or disconnected string broadcast device. That is, the system is also capable of discovering when a new device is connected to wireless module 1004 or a connected device becomes disconnected from the wireless module 1004. FIG. 3 describes the process by which the system discovers connection and disconnection of devices. At 3002, the computer 1006 of broadcast device 1002 monitors the wired and wireless interfaces of wireless module 1004 to determine (discover) whether a new string broadcast device 220 has been connected or a connected string broadcast device 220 has become disconnected. If the computer 1006 determines that a connected string broadcast device 220 has become disconnected at 3004, the computer instructs the server 1008 to deregister the disconnected string broadcast device at 3006. The process then returns the discovering string broadcast devices at 3002. If, on the other hand, the computer 1006 discovers that a string broadcast device 220 has been newly connected (3008), the computer instructs the server 1008 to register the newly connected string broadcast device at 3010. The process then continues to 2008 (FIG. 2) where configuration data is received from the server 1008 at the wireless broadcast device 1002. Otherwise, if the computer 1006 fails to discover any newly connected or disconnected devices at 3008, then the process continues to 2008 (FIG. 2) without any registration or deregistration of any device.

Once the system has identified or discovered connected or disconnected devices as described above, and upon completion of reporting the discovery to server 1008 from the computer 1006, the server 1008 may update a directory that stores a list of devices, for example connected, previously connected or disconnected devices, to reflect a current status of each respective device. Additionally, although the process has been described as the computer 1006 discovering whether a device has become connected or disconnected, the system is not limited to the disclosed embodiment. For example, in an alternative embodiment, the server 1008 may be responsible for discovering new connections or disconnections.

Figure 4:
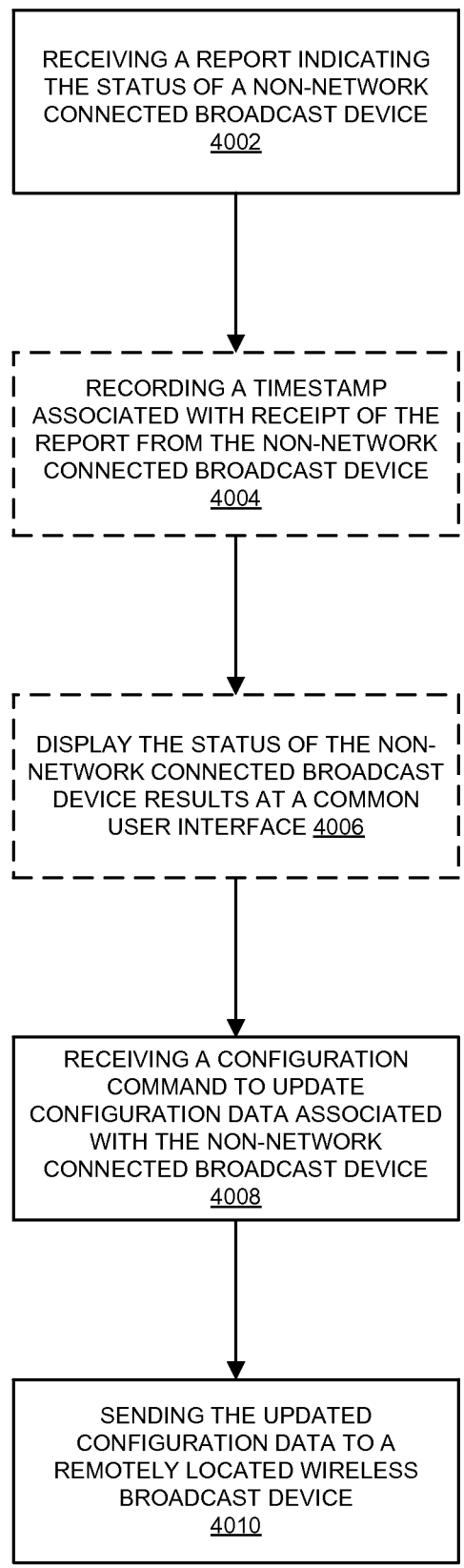
FIG. 4 is an exemplary flow diagram of remotely monitoring the status and updating the configuration of a broadcast device.
Figure 8:
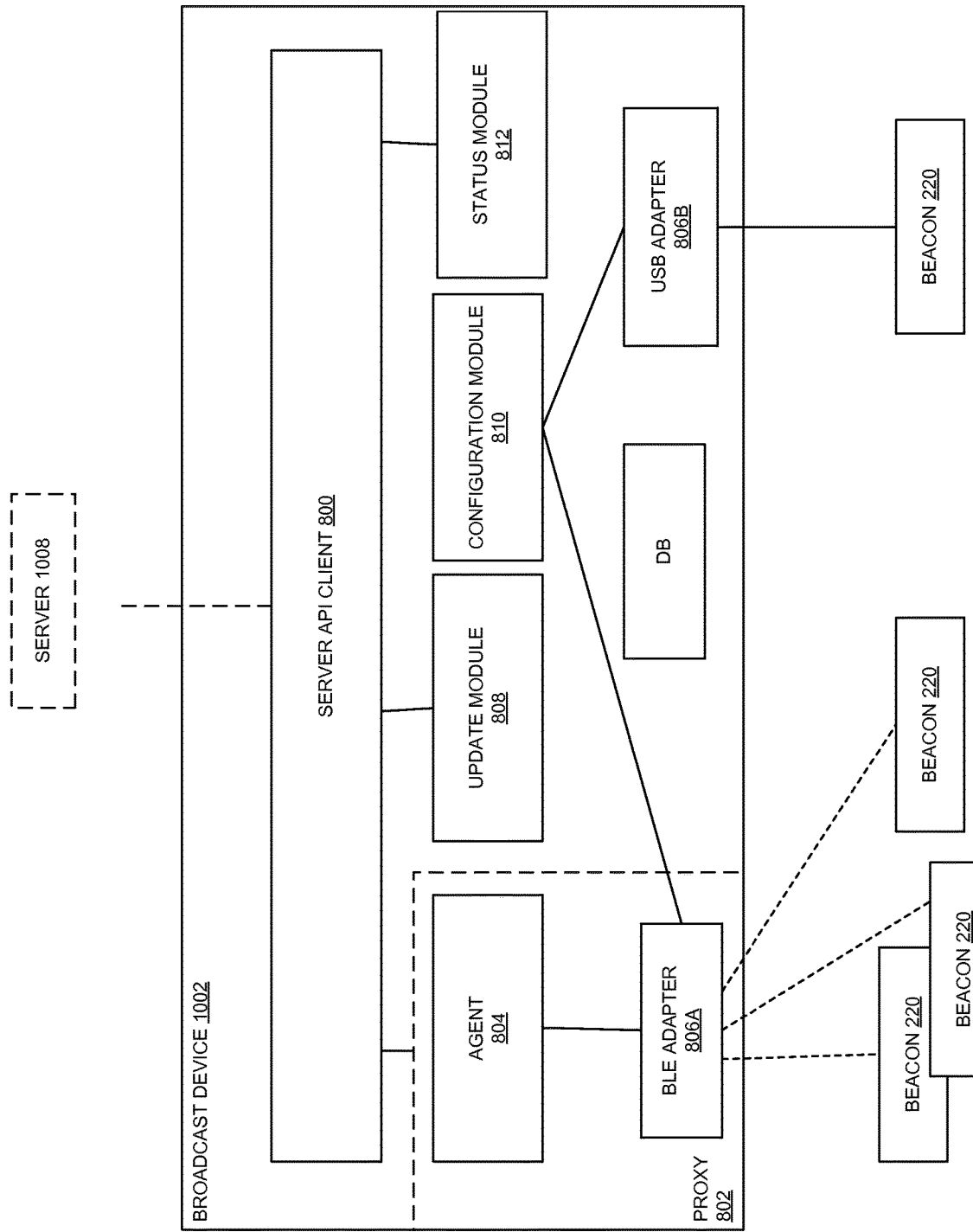
FIG. 8 is an exemplary diagram illustrating a remotely configurable wireless broadcast device.
Figure 9:
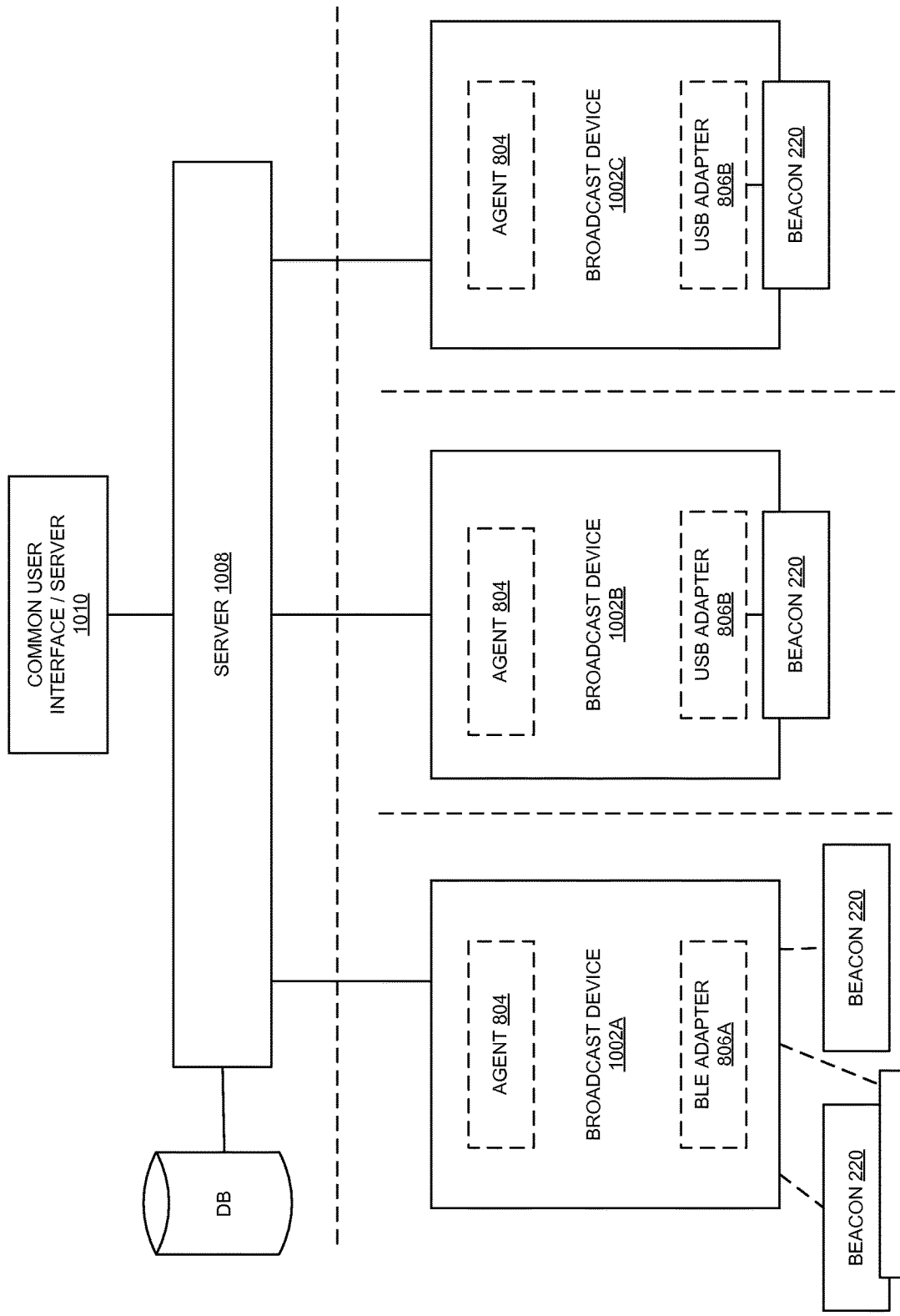
FIG. 9 is an exemplary diagram illustrating multiple remotely configurable wireless broadcast devices and a server connected to a common user interface.

FIG. 4 is an exemplary flow diagram of remotely monitoring the status and updating the configuration of a broadcast device. At 4002, the server 1008 receives a report from the wireless broadcast device 1002, via network connected computer 1006. In one embodiment, the report is in the form of a web request that is initially sent from the string broadcast device 220 via the wireless broadcast device 1002 to the server 1008. The web request may be, for example, a message sent via http over network 101, such as the Internet. The report (message) indicates, for example, the status of a non-network connected broadcast device, such as string broadcast device 220, as previously described. Upon receipt of the report at the server 1008, the server 1008 optionally timestamps the report and records the information at 4004, for example, in a local or connected storage system or database DB (FIGS. 8 and 9). (It is also appreciated that the report may be optionally time stamped by the computer 1006 at the time of being sent to the server 1008). The time stamped information may be used to aid in monitoring of the status of string broadcast devices 220 connected (or disconnected) to the wireless broadcast device 1002.

The report (time stamped or not) including the status information of the string broadcast devices 220 may also be optionally displayed at a common user interface 1010 to a user at 4006. The common user interface 1010 may be used by a user to instruct (via a configuration command) the server 1008 to provide updated information (configuration data) to the wireless broadcast device 1002 for programming the non-network connected devices. Alternatively, the server 1008 may automatically access a list of commands (configuration commands) stored in a storage system or database DB. Any one or more of the commands may be provided to the server 1008 based on an analysis of the reported status by a processing engine with analytics. At 4008, the server 1008 receives a configuration command from the common user interface 1010 (or from the processing engine and database) commanding the server 1008 to provide updated information (configuration data) for each of the string broadcast devices 220 associated with the updated configuration data. The server 1008 then sends the updated configuration data to the remotely located wireless broadcast device, at 4010, to update respective string broadcast devices 220 connected to the wireless broadcast device 1002.

Exemplary Use Scenarios

The following scenarios are examples of monitoring and updating a string broadcast device using the system and processes illustrated in FIGS. 1-9.

In a first exemplary scenario, the string broadcast device reports its status. For example, the string broadcast device provides the computer with a status that may be sent as a web request to the server. The web request informs the server of its health and requests instructions at a set interval. In response, a server records a timestamp of when the string broadcast device last reported its status. A user views a web page at a common interface showing the status the string broadcast device, which displays for example a "broadcast device ON" indicator if the timestamp is within a threshold time period.

In a second exemplary scenario, the string broadcast device retrieves configuration data. At a predetermined interval of time, the computer sends a web request from the string broadcast device to the server that provides "health" information and requests instructions. In response, the server provides a list of settings requiring update on the string broadcast device (e.g., on/off, identifiers, advertisement frequency, transmit power, etc.). The computer receives the list of updates from the server and applies them to the respective string broadcast device.

In a third exemplary embodiment, the string broadcast device upgrades software. At a set interval, the computer sends a web request to the server providing "health" information about one or more string broadcast devices. Additionally, the request invites instructions from the server. The server responds with a URL where the computer may access and download a copy of software for updating the one or more string broadcast devices. The computer downloads the software as instructed by the server and installs on the one or more string broadcast devices. The computer may also report to the server whether the software has been successfully installed on the string broadcast device.

As appreciated, the above use scenarios are non-limiting and exemplary embodiments. The disclosure is not limited to the specific embodiments.

Figure 5:
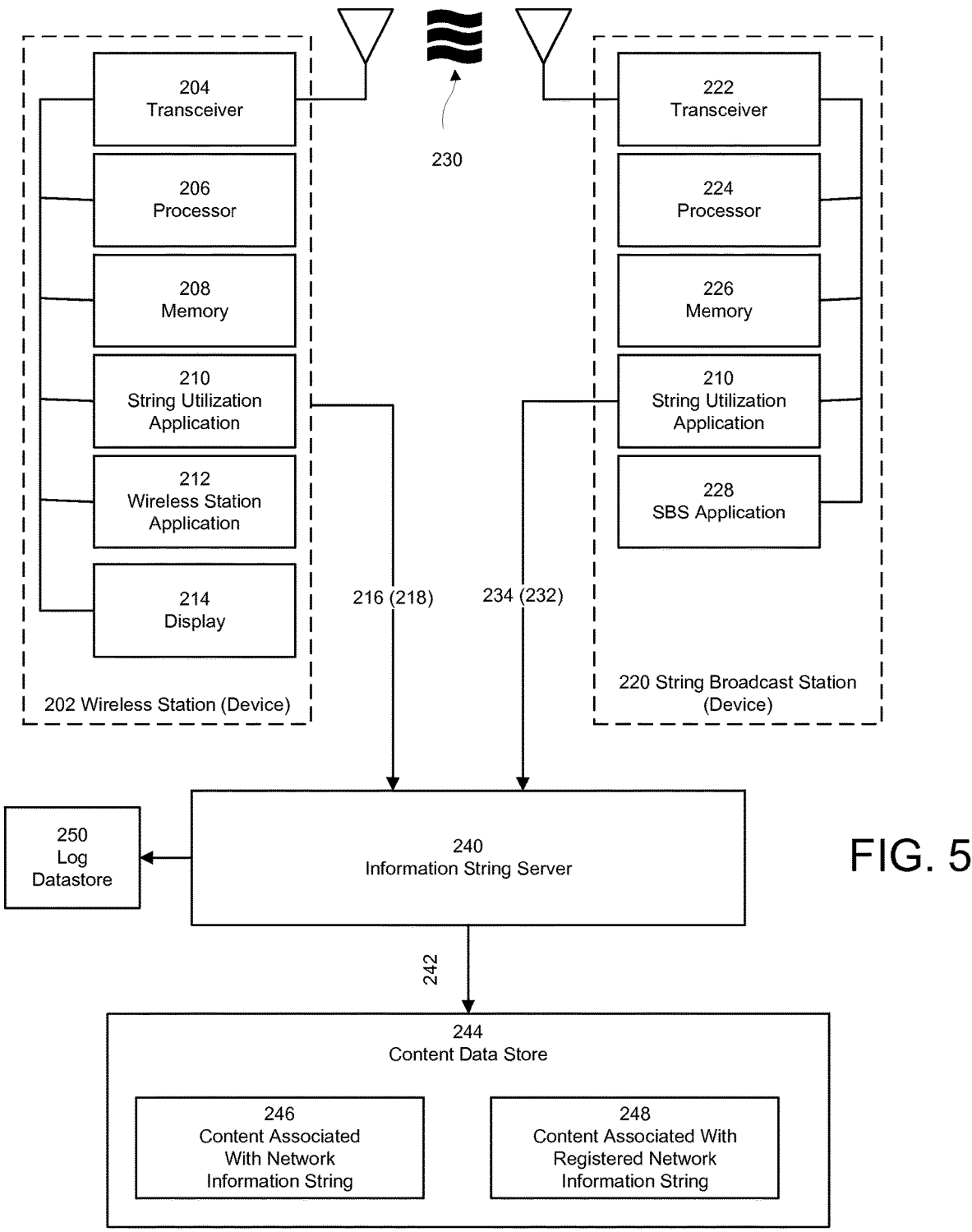
FIG. 5 is an exemplary diagram illustrating a process by which content may be associated with a network information string and stored.

FIG. 5 is an exemplary diagram illustrating a process by which content may be associated with a network information string and stored. In an embodiment, content, or a link to content, may be stored in the record associated in a datastore in association with the network information string. Content may be stored by either the operator of the SBS and/or by a user of a wireless station. By way of illustration and not by way of limitation, the content may include coupons, announcements, menus, news alerts, messages, photos, directions or links to additional content on other servers.

A wireless station (device) 202, such as for example and without limitation a Wi-Fi enabled device, comprises a transceiver 204, a processor 206, a memory 208, a wireless station application 212 and a display 214. The wireless station 202 also operates an instance of string utilization application 210. The wireless station application 212 provides instructions to the processor 206 of the wireless station 202 to enable the wireless station 202 to interact with the string broadcast station (device) SBS 220, such as for example and without limitation a Wi-Fi string broadcast station, as is known in the art.

In an embodiment, an SBS 220 comprises a transceiver 222, a processor 224, a memory 226, and an SBS application 228. The SBS 220 also operates an instance of the string utilization application 210. The SBS application 228 provides instructions to the processor 224 of the SBS 220 to enable the SBS 220 to at least enable the SBS 220 to transmit beacon message 230. In an embodiment, the SBS 220 broadcasts a message 230 (in the illustration referred to herein as a beacon message) that includes a network information string. The network information string may be an SSID or a portion of an SSID as previously described.

Content may be delivered to, and stored in, a content datastore 244 by either the operator of the SBS 220 and/or the user of the wireless station 202. The content datastore 244 is illustrated as supporting two records. The record 246 allows content to be stored in association with a network information string without regard to the ownership of the registration of the network information string. Thus, the operator of the SBS 220 or the user of the wireless station 202 may submit content to the content datastore for association with a network information string and the content will be stored in the record 246. The record 248 is reserved for storage of content by a registered owner of a network information string.

In an embodiment, an operator of the SBS 220 may send a message 232 over a link 234 conveying content or a link to content and the network information string to the information string server 240. The information string server stores the content or the record 246 in the content datastore 244 associated with the network information string or in record 248 if the network information string has been registered by the operator of the SBS 220. The content may be associated with a network information string rule allowing delivery of the content during a particular time period. For example, a business may operate an SBS. The additional content scheduled for evening and night hours may indicate nightly specials, a message that the business is currently closed, or other time-sensitive information. During those specific time periods, potential customers may be directed to the business's website for more information.

In another embodiment, the additional content is stored in a record of the information string server 240 in association with the MAC address of an SBS. The MAC address may also be used in combination with the network information string or alone. The association of an SBS MAC address with a network information string allows the record 246 or the record 248 to store content that is specific to a particular SBS. When information is requested from the content data store 244, the MAC address may be included in the request. In this way, the content that is returned is specific to an SBS and the area that is served by that SBS. For example, a network information string may be used by the operator of a business that has multiple locations each with its own SBS. The operator may elect to issue a coupon for one location only. By tying the coupon to the MAC address of that specific SBS, the coupon will be served only when a request for content (described below) includes both the network information string and the correct MAC address.

In another embodiment, content is provided by a user of a wireless station, such as for example and without limitation a Wi-Fi enabled device. In this embodiment, a beacon message 230 is received at the wireless station 202 operating the string utilization application 210. By way of illustration and not by way of limitation, the wireless station 202 may be a cell phone, a smart phone, a tablet or a laptop computer. The string utilization application 210 may be utilized to receive or create content for association with the network information string broadcast by the SBS 220. The string utilization application 210 creates a message 218 conveying the content and the network information string, and optionally, the MAC address of the SBS 210 that transmitted the beacon message 230, to the information string server 240 via link 216. The content data_store 244 stores the content in association with the network information string in a record 246 that is associated with the network information string supplied in the message. When the SBS MAC address is included in the message 216, the content is stored in association with both the network information string and the MAC address. The MAC address may be used to establish a general location of the SBS 210, which location may be used in certain messages. For example, an operator of a wireless station may leave a message to gather at a location proximate to the location of the SBS 220 that broadcasts a particular network information string. As another example, the operator of a wireless station may also leave comments about a venue that is proximate to the location of the SBS 220 that broadcasts a particular network information string, such as feedback or a review of their products or services.

In an embodiment, the owner of the network information string has privileges that allow it to control the content in both record 246 and record 248. For example, the registered owner of a network information string may remove some or all of the content in record 246 that is associated with the registered network information string. A registered owner may also block the association of content to the registered network information string except by the registered owner.

As illustrated in FIG. 5, the content datastore 244 is physically separate from the information string server 240. In this configuration, the content data store 244 may be located on a server that is accessible to the information string server 240 via a link 242 and to the wireless station 202 via the link 216. In another embodiment, the content datastore 242 is a component of the information string server 240 and the content datastore 244 is served by the information string server 240 to the wireless station 202 via the communication link 216.

Requests to share content may be logged in the log datastore 250. The logged data may include identifying information of the wireless station 202, identifying information of the user of the wireless station 202, the network information string associated with the requested content, the time when the request for content was made and the location of the wireless station when the request for content was made. The logged data captured in log datastore 250 may be used to identify user preferences, determine the response of the user of the wireless station 202 to the content 234 associated with the network information string, and measure the interest of the user of the wireless station 202 in types of content.

In another embodiment, content is stored in a memory of a wireless station, such as, for example and without limitation, memory 208 of wireless station 202. By way of illustration and not by way of limitation, the content may be stored in memory 208 of the wireless station 202 at the direction of a user of the wireless station 202, by virtue of the configuration of string utilization application 210, or in response to the acquisition of content by the wireless station 202 from the content datastore 244 (acquisition of content from the content datastore 244 is discussed in detail below). For example, a user may configure a wireless station to play an audio file when in proximity to an SBS that is broadcasting a network information string that includes the word "coffee." The string utilization application 210 may also acquire content (for example, a coupon for a pastry) in response to receipt of a network information string from a first SBS that includes the word "coffee," wherein the coupon is presented when the wireless station receives a network information string (for example, "helen's cakes") from a second SBS.

Figure 6:
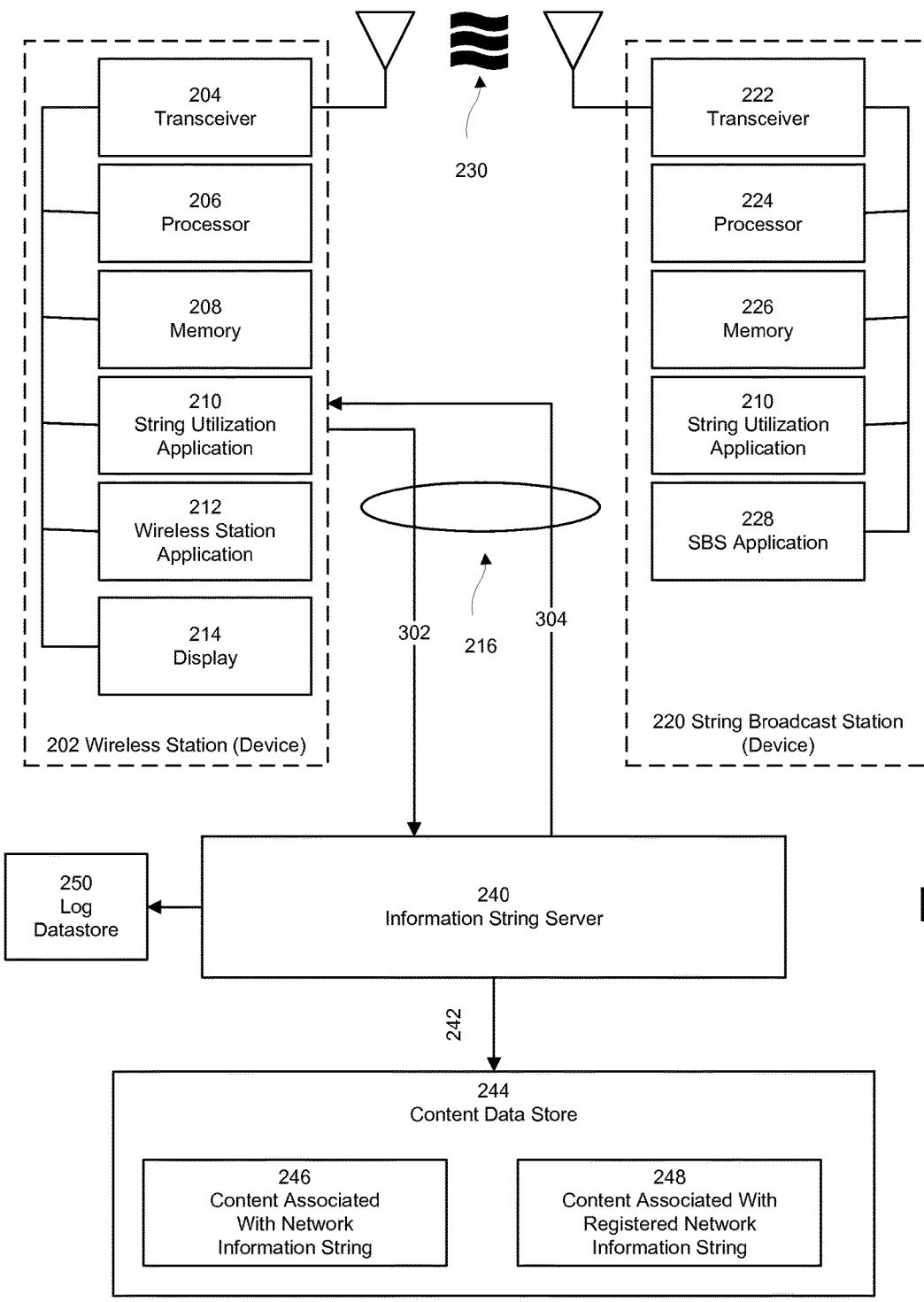
FIG. 6 is an exemplary diagram illustrating acquisition of content associated with a network information string.

FIG. 6 is an exemplary diagram illustrating acquisition of content associated with a network information string. A wireless station (device) 202, such as for example and without limitation a Wi-Fi enabled device, comprises a transceiver 204, a processor 206, a memory 208, a wireless station application 212 and a display 214. The wireless station 202 also operates an instance of string utilization application 210. The wireless station application 212 provides instructions to the processor 206 of the wireless station 202 to enable the wireless station 202 to interact with the SBS 220 as is known in the art.

In an embodiment, an SBS 220 comprises a transceiver 222, a processor 224, a memory 226, and SBS application 228. The SBS 220 also operates an instance of string utilization application 210. The SBS application 228 provides instructions to the processor 224 of the SBS 220 to at least enable the SBS 220 to transmit beacon message 230. In another embodiment, the SBS 220 broadcasts a beacon message 230 that includes a network information string that is associated with content stored on the information string server 240. The network information string may be associated with content stored in a record 246 or 248 held on content data store 244. The beacon message 230 may also include the MAC address of the SBS 220. In an embodiment, the SBS 220 provides wireless stations that associate with SBS 220 access to a network (not illustrated). In another embodiment, the SBS 220 is configured to broadcast beacon message 230 but is not configured to provide network access. In another embodiment, the SBS 220 not capable of providing connectivity to a network.

A wireless station 202 is configured with a string utilization application 210 to be executed by processor 206. By way of illustration and not by way of limitation, the wireless station 202 may be a cell phone, a smart phone, tablet, a laptop computer, a vending machine or a cash register. The wireless station 202 may receive one or more beacon messages, including beacon message 230. In one embodiment, the string utilization application 210 examines the network identifier of each beacon message to determine if the network identifier contains a network information string included on a network information string list stored in a memory accessible to the wireless station 202, such as memory 208. When the string utilization application 210 receives a listed network information string, the string utilization application 210 may check a memory accessible to the wireless station 202, such as memory 208, for content that is associated with the network information string. If the content is not found in the memory accessible to the wireless station 202, the wireless station 202 may send a content request message 302 that includes the network information string to the information string server 240 via link 216.

Alternatively, the string utilization application 210 passes the network identifier from each beacon message to the information string server 240 for inspection without first examining the network information string. The information string server 240 examines the network identifier of each beacon message to determine if the network identifier contains a network information string associated with content stored in a data stored device accessible to information string server 240, such as content datastore 244.

As previously described, the network information string may include all or a portion of the network identifier (e.g., the SSID) that is broadcast by the string broadcast station 220. For example, a coffee shop chain may assign the SSIDs joesjava1, joesjava2 . . . joesjava[n] to its "n" shops. It may register the network information string "joesjava" to provide the same message to all of its patrons regardless of which shop a patron is visiting. It may also register joesjava[n] in association with string broadcast station MAC addresses to provide messages on a per-shop basis.

In another embodiment, the acquisition of content is based at least in part on the MAC address of the string broadcast station 220 that is included in the beacon message 230. In this embodiment, the MAC address may be associated with the network information string and with the content on the content datastore 244. The MAC address may be used to acquire content that is specific to a particular venue at which the SBS 220 is located.

The content request message 302 may also include credentials of the user of the wireless station 202. The credentials are evaluated by the information string server 240 prior to responding to a request to obtain content from the information string server. For example, the requestor may be required to first obtain a user ID and password from the information string server or from an authentication server utilized by the information string server. In an embodiment, the string utilization application 210 operating on the wireless station 202 may be configured to present the credentials required to access the information string server 240. In another embodiment, the user of the wireless station 202 may establish a session of a fixed time period with the information string server 240 by presenting the required credentials to the information string server 240.

The information string server 240 responds by sending a content response message 304 to the wireless station 202 via the link 216. By way of illustration and not by way of limitation, the additional content may include coupons, announcements, menus, news alerts, photos, directions or links to additional content on other servers. The content datastore 232 is physically separate from the information string server 240. In this configuration, the content datastore 244 may be located on a server that is accessible to the information string server 240 via a link 242 and to the wireless station 202 via the link 216. In another embodiment, the content datastore 244 is a component of the information string server 240 and the content is served by the information string server 240 to the wireless station 202 via the link 216.

The wireless station 202 communicates with the information string server 240 and receives content from the content datastore 232 via a communication link 216. The link 216 may be a wired link, a wireless link that is provided via a cellular network or a wireless link that is provided over a variety of wireless protocols. Alternatively, the link 216 may be provided wirelessly through a gateway (not illustrated) that connects a wireless network to a wired network such as the Internet. The wireless portion of the link may be provided through string broadcast station 220 or through another string broadcast station (not illustrated).

Requests for content may be logged in the log datastore 250. The logged data may include identifying information of the wireless station 202, identifying information of the user of the wireless station 202, the network information string associated with the requested content, the time when the request for content was made, and the location of the wireless station when the request for content was made. The logged data captured in log datastore 250 may be used to identify user preferences, determine the response of the user of the wireless station 202 to the content associated with the network information string, and measure the interest of the user of the wireless station 202 in types of content.

Embodiments hereof allow a message to be addressed to any wireless station that enters the range of a beacon signal sent by an SBS. Cell phones, smart phones, laptop computers, automated software, vending machines and cash registers can perform the functions using the system of the invention. The messages may convey marketing information, public service information, traffic information, instructions for persons with disabilities, sports scores, weather information, time schedules, and emergency instructions among other information. The messages may be displayed as text, images or audio or a combination of the same.

Figure 7:
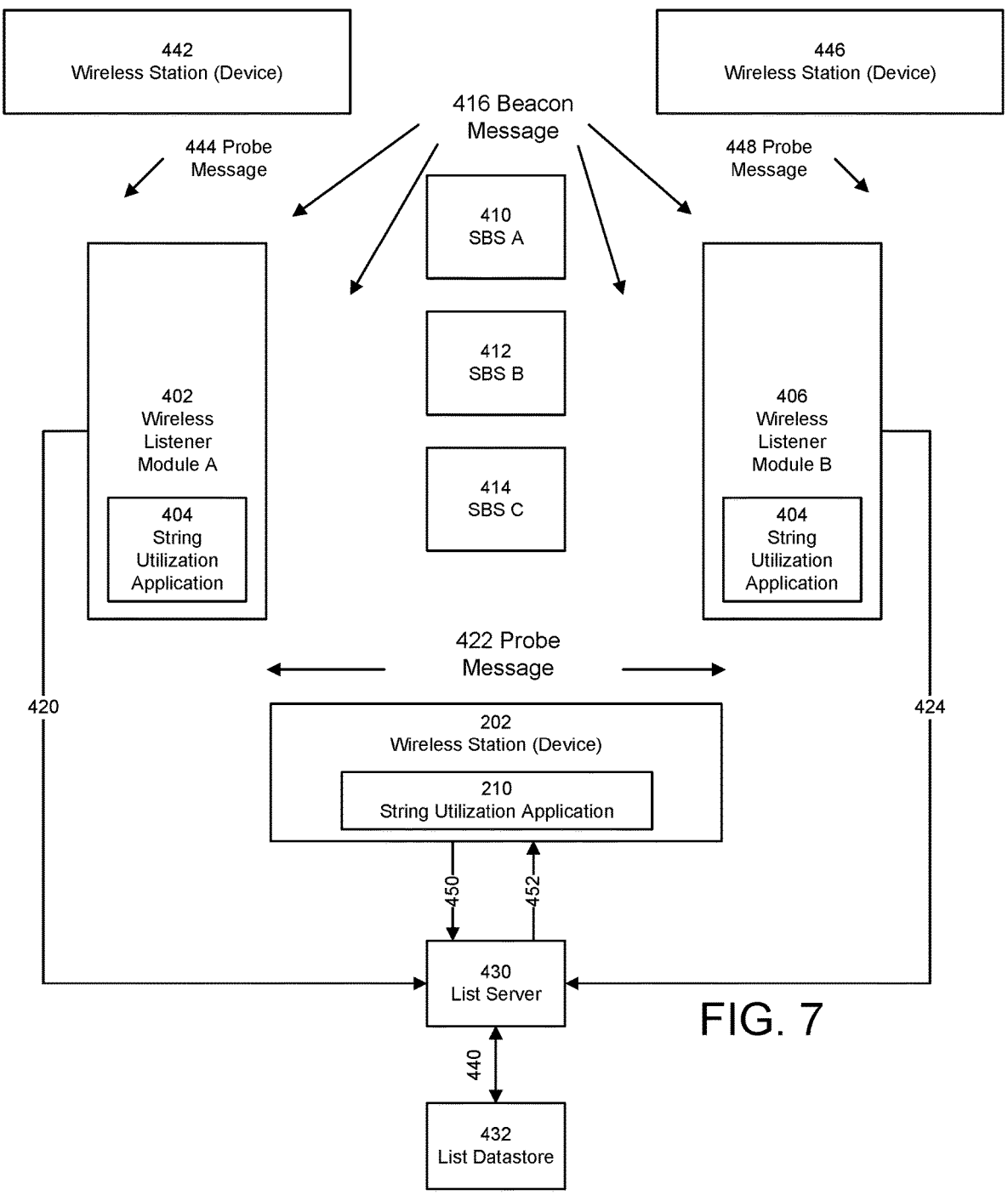
FIG. 7 is an exemplary diagram illustrating operations performed by a listener module according to an embodiment.

FIG. 7 is an exemplary diagram illustrating operations performed by a listener module according to an embodiment. Wireless listener module (device) A and B (elements 402 and 406) are configured to listen for beacon messages 416 transmitted by string broadcast stations, such as SBS A, SBS B and SBS C (elements 410, 412 and 414). In an embodiment, an SBS beacon message 416 comprises a network information string. A wireless listener module (elements 402 and 406) operating a string utilization application (element 404) receives one or more beacon messages 416 and obtains the network information string from each received beacon message. The wireless listener modules (elements 402 and 406) also receive a probe message 422 from a wireless station 202. The probe message includes the media access controller (MAC) address of the wireless station 202. Wireless station 202 operates string utilization application 210. In another embodiment, wireless listener module 402 also receives probe message 444 from wireless station 442. The probe message 444 includes the media access controller (MAC) address of the wireless station 442. Wireless station 442 does not operate an instance of the string utilization application 210. Similarly, wireless listener module 404 also receives probe message 448 from wireless station 446. The probe message includes the MAC address of the wireless station 446. Wireless station 446 also does not operate an instance of the string utilization application 210. Thus, a wireless listener modules receive probe and beacon messages from wireless stations and SBSs that are within range of the wireless listener module.

In an embodiment, a wireless listener module, such as module A and B, may also be configured to operate as an SBS and broadcast an SBS beacon message that comprises a network information string. A wireless listener module, such as wireless listener module A 402, associates the MAC address of the wireless station 202, the MAC address of wireless station 442, the MAC address of wireless station 446 and the MAC address of listener module A with the network information strings received from each beacon message 416 and sends the information strings and the MAC addresses to a list data server 430 for storage in a listener datastore 432. The wireless listener module A 402 may also provide a timestamp that indicates when the wireless station 202 was proximate to the listener module A 402.

As illustrated in FIG. 7, wireless listener module A 402 connects to the list data server 430 via a link 420 and wireless listener module B 406 connects to list data server 430 via link 424. The links 420 and 424 may be wireless links, such as via a wireless LAN or a wireless telephone network, or may be a wired link, such as via DSL line, a cable network, or a fiber network. In another embodiment, wireless listener modules A 402 and B 406 communicate with each other and other wireless listener modules via a mesh network (not illustrated).

Using an instance of the string utilization application 210, the wireless station 202 may send a string data request message 450 for a list of network information strings proximate to its current location from the list server that have been reported by one or more listener modules, such as wireless listener module A 402, that have also detected the probe message and the MAC address of the wireless station 420. The string data request message 450 includes the MAC address of the wireless station 202. The list server 430 may respond to the string data request message 450 by acquiring a list of network information strings associated with the MAC address of the wireless station 202 from the list datastore 432 and sending the list to the wireless station 202 in a string data response message 452.

In an embodiment, a wireless listener module, such as wireless listener module A 402, may listen for probe messages periodically. The time of receipt of a probe message 422 is captured by a timestamp. When a wireless station moves out of range of the wireless listener module A 402, the elapsed time between a current time and the time indicated by a last time stamp will increase. This elapsed time period may be used by the datastore 432 to measure the age of data relating to a MAC address and to log data (for example, MAC address and associated network information strings) to the list datastore 432 or to delete data of a particular age.

While FIG. 7 illustrates two listener modules A and B, the illustration is not limiting. Any number of listener modules may be deployed in a physical space to form a listener network. Because the location of each listener module within the listener network is known, the location of a wireless station that broadcasts a probe message (without regard to whether the wireless station operates a string utilization application) may be tracked within the listener network. Time stamping of the receipt of probe messages by each listener module within the listener network allows the presence, path, time at location, number of visits to a location, and other metrics to be determined on a per wireless station basis. Additionally, the tracking data may be used to construct reports. For example, the tracking data may indicate that 3,000 wireless station passed by a particular listener module during a single day and that 78% of these also passed by the listener module the previous day. The tracking data may be of interest to city planners, businesses and public safety officials. For example, traffic outside a potential terrorist target could be monitored to determine if the behavior of a particular wireless station is suspicious. FIG. 7 also illustrates a list data server 430 and a listener datastore 432. In an embodiment, these structures are components of information string server 240 (see, FIG. 5).

FIG. 8 is an exemplary diagram illustrating a remotely configurable wireless broadcast device as illustrated in FIG. 1. The broadcast device 1002 includes, for example, server API client 800, proxy 802 (including agent 804 and BLE adapter 806A), update module 808, configuration module 810, status module 812 and USB adapter 806B. The broadcast device 1002 (also referred to herein as a wireless broadcast device) is also communicatively coupled to beacons 220 (the beacons are also referred to herein as string broadcast devices or stations). The beacons 220 have been described with reference to FIGS. 5-7 and will not be repeated. The wireless broadcast device 1002 may also include a database DB, which may be any datastore, storage system or database as readily understood in the art, and may be located within or external to the wireless broadcast device 1002. Wireless broadcast device 1002 is also remotely located from and communicatively coupled to server 1008 via network 101 (FIG. 1). Communication between the server 1008 and the wireless broadcast device 1002 (and the components and modules included therein) is implemented using the server API client 800 via network 101 (not shown), as well-known in the art.

Proxy 802 includes, for example, an agent 804 and an adapter 806A such as a BLE enabled adapter. The proxy 802 is responsible for controlling and managing beacons 220 connected to the wireless broadcast device 1002. The beacons 220, as described above, are non-network connected devices and not capable of long range communication. That is, the beacons 220 include short range communications devices that enable communication with devices, such as a smartphone, that are in close proximity thereto. The proxy 802 (as part of the wireless broadcast device 1002) therefore enables communication with the beacons 220 to provide an indirect pathway to the server 1008 via network 101. Thus, the beacons 220 which are otherwise unable to communicate with the server 1008, may now receive network communications from the server 1008 via wireless broadcast device 1002 (and proxy 802). As appreciated, this affords the server 1008 with the capability to program and update the beacons 220, as well as receive status updates from the beacons 220 via the proxy 802.

An agent 804 in proxy 802 is capable of monitoring the beacons 220 to determine a status and report the status to the remotely located server 1008. The agent 804 is also responsible for requesting any updates or instructions, such as updated configuration data, from the server 1008, via status module 812. The agent 804 may additionally or alternatively, discover newly connected and disconnected beacons 220 to the wireless broadcast device 1002. In response to discovering a newly connected beacon 220 or a disconnected beacon 220, the agent 804 reports the discovery to the remotely located central server 1008 via status module 812. The proxy 802 also includes one or more adapters 806A, such as a BLE adapter. The BLE adapter is configured to wirelessly communicate with beacons 220 that are configured, for example, with Bluetooth low energy (BLE) communication technology. The beacons 220 may also communicate with the proxy 802 via USB adapter 806B or any other well-known adapter technology. That is, the type of adapter or connection protocol is not limited to the described embodiments, but may be any well-known type of adapter or communication interface and protocol.

The update module 808 receives configuration data from the server 1008. When receiving configuration data from the server 1008, the configuration data is received via server API client 800 at the wireless broadcast device 1002 and stored in the configuration module 810. The update module 808 is communicatively coupled with the configuration module 810, and sends the configuration data to the configuration module 810 for storage. The configuration data may be stored at the configuration module 810 or at the database DB. The configuration module 810 is also responsible for instructing the proxy 802 to configure one or more of the beacons 220 based on the configuration data upon receipt of a command to update one or more of the beacons 220. When instructed via a configuration command, the proxy 802, via BLE or USB adapters 806A/806B, configures a respective one or more beacons 220 based on the configuration data. The status module 812 is configured to monitor and identify configuration changes in the beacons 220 and/or configuration updates that are ready for transmission in server 1008. Thus, the status module 812 communicates in a bi-directional manner to "poll" the beacons 220 and server 1008 for any changes or updates. It is appreciated that the disclosed embodiments are non-limiting, and that any one or more of the described components or modules may be combined or modified.

In one embodiment, the server API client 800, proxy 802 (and agent 804 and BLE adapter 806A), the update module 808, the configuration module 810, the status module 812 and the USB adapter 806B together comprise computer 1006 (FIG. 1). However, it is appreciated that the various components and modules may be part of more than one computer and/or processor and may be software, hardware or firmware.

FIG. 9 is an exemplary diagram illustrating multiple remotely configurable wireless broadcast devices and a server connected to a common user interface as illustrated in FIGS. 1 and 8. The system depicted in FIG. 9 includes, for example, a server 1008, a common user interface/server 1010, a databased DB communicatively coupled to the server 1008, broadcast devices (wireless broadcast devices) 1002A, 1002B and 1002C, and beacons (string broadcast devices or stations) 220. Details of each system component are described above with reference to the various figures and embodiments, and will not be described again herein. However, in the figure, the wireless broadcast devices 1002A, 1002B and 1002C each operate independently. Additionally, although operating independently, the wireless broadcast devices 1002A, 1002B and 1002C may be geographically located in the same room or remotely located at separate geographic locations and may communicate with each other via server 1008. As illustrated, each of the wireless broadcast devices 1002A, 1002B and 1002C are in communication with server 1008 via network 101 (not shown). Thus, each of the wireless broadcast devices 1002A, 1002B and 1002C are remotely located from and configurable by the server 1008, as described in the above disclosed embodiments.

In one exemplary implementation of the system depicted in FIG. 9, wireless broadcast device 1002A is located at a first place of business, such as a pharmacy; wireless broadcast device 1002B is located at a second place of business, such as an indoor arena; and wireless broadcast device 1002C is located at a third place of business, such as an office building. As described, each of the wireless broadcast devices 1002A, 1002B and 1002C are located at different geographic locations and in communication with server 1008. Moreover, in each of the geographic locations, multiple beacons 220 are deployed for use. For example, one hundred beacons 220 are deployed in each location to broadcast a message to one or more users of a wireless device, such as a smartphone. In order to ensure that each of the one hundred beacons 220 are operating properly at each location, the wireless broadcast devices 1002A, 1002B and 1002C, at respective locations, monitors the beacons 220 for status updates. Similarly, the wireless broadcast devices 1002A, 1002B and 1002C send requests to the server 1008 requesting instructions when new information (configuration data) becomes available. When the status of a beacon changes or becomes connected or disconnected, or the server 1008 has new information to update one or more of the beacons 220, the configuration data is sent from the server 1008 to the beacons 220 via a respective wireless broadcast device 1002A, 1002B and 1002C. Accordingly, a remotely located server 1008 is able to update and configure non-network connected beacons 220 through one of the wireless broadcast devices 1002A, 1002B and 1002C which is connected the server 1008 via network 101 (not shown). It is appreciated that the described implementation is non-limiting and exemplary in nature.

Figure 10:
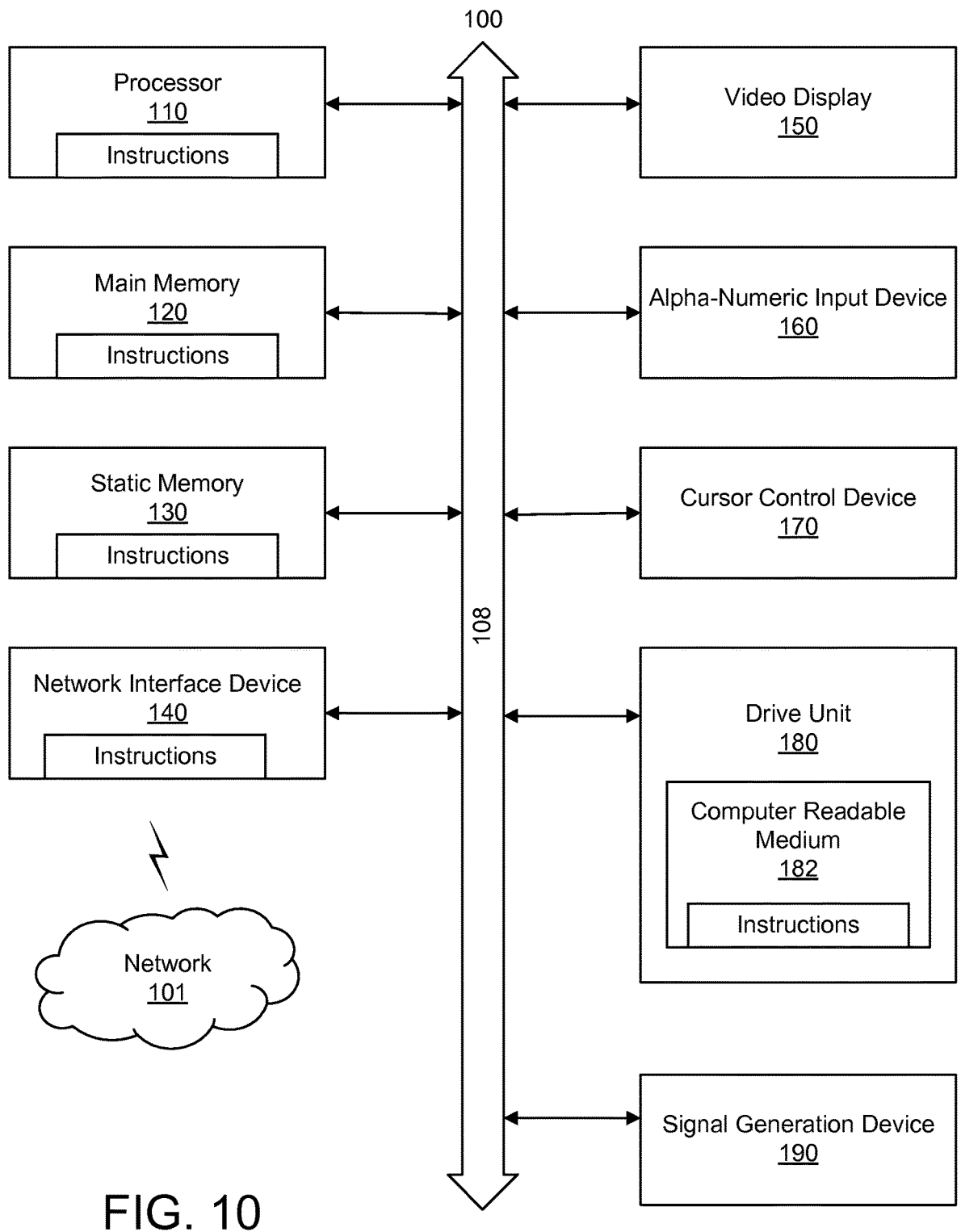
FIG. 10 shows an exemplary general computer system that may be used to implement the system depicted in FIGS. 1-9.

FIG. 10 is an illustrative embodiment of a general computer system. The general computer system which is shown and is designated 100 may be used to implement the device illustrated in FIGS. 1-9. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as an call interceptor, an IVR, a context manager, an enrichment sub-system, a message generator, a message distributor, a rule engine, an IVR server, an interface server, a record generator, a data interface, a filter/enhancer, a script engine, a PBX, stationary computer, a mobile computer, a personal computer (PC), a laptop computer, a tablet computer, a wireless smart phone, a personal digital assistant (PDA), a global positioning satellite (GPS) device, a communication device, a control system, a web appliance, a network router, switch or bridge, a web server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 10, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each, and processor 110, other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 10, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

In one embodiment, there is a remotely configurable wireless broadcast device connected to a network, including a status module configured to monitor and identify configuration changes in one or more non-network connected broadcast devices, and to communicate the changes to a remotely located central server; a proxy, communicatively coupled to the status module, configured to communicate with the one or more non-network connected broadcast devices and operable to control the plurality of non-network connected broadcast devices; an update module configured to receive configuration data for one or more of the non-network connected broadcast devices, the configuration data including information to configure one or more of the non-network connected broadcast devices; a configuration module configured to store the configuration data for each of the one or more non-network connected broadcast devices and to instruct the proxy to configure one or more of the non-network connected broadcast devices based on the configuration data; and responsive to a configuration command received from the remotely located central server via the network, the configuration module controls the proxy to update a respective one or more of the non-network connected broadcast devices with the configuration data.

In another embodiment, there is a method of remotely configuring a wireless broadcast device over a network, including monitoring a plurality of string broadcast devices to determine a respective status, and reporting the status to a remotely located server; receiving configuration data for one or more of the string broadcast devices from the remotely located server, the configuration data including information to configure one or more of the string broadcast devices; storing the configuration data for one or more of the string broadcast devices and instructing a proxy, communicatively coupled to the plurality of string broadcast devices, to configure one or more of the string broadcast devices based on the configuration data; and responsive to a configuration command received from the remotely located server, controlling the proxy to configure a respective one or more of the string broadcast devices based on the configuration data sent with the configuration command.

In still another embodiment, there is a wireless broadcast device, including a plurality of string broadcast devices configured to transmit a message to one or more wireless devices associated with a user; and a network connected processor communicatively coupled to and controlling the plurality of string broadcast devices; the processor configured to receive configuration data for one or more of the string broadcast devices and provided by a remotely located server, the configuration data including identification information to configure the one or more string broadcast devices; the processor configured to, responsive to a configuration command received from the remotely located server, configure a respective one or more of the string broadcast devices based on the configuration data; and the processor configured to communicate changes to the remotely located server responsive to identified configuration changes in one or more of the string broadcast devices.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A remotely configurable wireless broadcast device connected to a network, comprising:
   a status monitor identifying configuration changes in one or more non-network connected broadcast devices, and communicating the changes to a remotely located central server via a report in the form of a web request initially sent from the one or more non-network connected broadcast devices;
   a proxy, communicatively coupled to the status monitor, communicating with the one or more non-network connected broadcast devices and controlling the plurality of non-network connected broadcast devices;

an updater receiving configuration data for one or more of the non-network connected broadcast devices from the remotely located central server, the configuration data including an update to software or firmware to configure one or more of the non-network connected broadcast devices based on a status of the non-network connected broadcast devices previously communicated to the remotely located server;

a configurer storing the configuration data for each of the one or more non-network connected broadcast devices and instructing the proxy to configure one or more of the non-network connected broadcast devices based on the configuration data received from the remotely located central server and previously communicated by the non-network connected broadcast devices; and responsive to a configuration command received from the remotely located central server via the network, and without physical intervention of the non-network connected broadcast devices, the configurer controlling the proxy to configure a respective one or more of the non-network connected broadcast devices to update the non-network connected broadcast devices based on the configuration data received from the remotely located central server.

2. The wireless broadcast device of claim 1, wherein a plurality of wireless broadcast devices are network connected to the remotely located central server.

3. The wireless broadcast device of claim 1, wherein the proxy further comprises:
an agent configured to:
monitor each of the plurality of non-network connected broadcast devices to determine a respective status, and to report the status to the remotely located central server in response to the monitoring, and
discover at least one of newly connected and disconnected non-network connected broadcast devices, and in response to the discovering reporting newly discovered non-network connected broadcast devices to the remotely located central server; and
one or more adapters configured to connect one or more of the non-network connected broadcast devices to the proxy for communication.

4. The wireless broadcast device of claim 3, wherein the status indicates at least one of an on/off state, a transmitter power level, an advertising frequency and a measured power calibration constant of one or more of the non-network connected broadcast devices.

5. The wireless broadcast device of claim 3, wherein newly discovered non-network connected broadcast devices are registered with the remotely located central server, and previously registered non-network connected broadcast devices are deregistered with the remotely located central server when disconnected.

6. The wireless broadcast device of claim 1, wherein the one or more non-network connected broadcast devices are dynamically configurable, via a common user interface connected to the remotely located central server, by modifying the configuration data.

7. The wireless broadcast device of claim 6, wherein the configuration data further includes at least one of updated settings and a universal resource locator (URL).

8. The wireless broadcast device of claim 3, wherein the one or more adapters communicate with one or more of the non-network connected broadcast devices using at least one of a Bluetooth connection and a USB connection.

9. The wireless broadcast device of claim 1, wherein the one or more non-network connected broadcast devices comprise
a memory storing the configuration data received by the wireless broadcast device;
a processor processing the configuration data and reconfigure the one or more non-network connected broadcast devices; and
a transmitter transmitting a message upon completion of being reconfigured and in accordance with the received configuration data.

10. The wireless broadcast device of claim 1, wherein one or more of the non-network connected broadcast devices is deployed in a place of business and transmitting the message to one or more wireless stations of customers.

11. A method of remotely configuring a wireless broadcast device over a network, comprising:
monitoring a plurality of string broadcast devices to determine a respective status, and reporting the status to a remotely located server via a report in the form of a web request initially sent from the one or more non-network connected broadcast devices;
receiving configuration data for one or more of the string broadcast devices from the remotely located server, the configuration data including an update to software or firmware to program one or more of the string broadcast devices based on a status of the non-network connected broadcast devices previously communicated to the remotely located server;
storing the configuration data for one or more of the string broadcast devices and instructing a proxy, communicatively coupled to the plurality of string broadcast devices, to program one or more of the string broadcast devices to update the non-network connected broadcast devices based on the configuration data received from the remotely located server and previously communicated by the non-network connected broadcast devices; and
responsive to a configuration command received from the remotely located server, and without physical intervention of the string broadcast devices, controlling the proxy to unilaterally program a respective one or more of the string broadcast devices based on the configuration data received from the remotely located server with the configuration command.

12. The method of claim 11, further comprising
discovering at least one of newly connected and disconnected string broadcast device and, in response to the discovering, reporting the newly discovered string broadcast device to the remotely located server.

13. The method of claim 11, wherein the status indicates at least one of an on/off state, a transmitter power level, an advertising frequency and a measured power calibration constant of one or more of the string broadcast devices.

14. The method of claim 12, further comprising
registering newly discovered string broadcast devices with the remotely located server, and
deregistering previously registered string broadcast devices with the remotely located server when disconnected.

15. The method of claim 11, further comprising dynamically configuring the one or more string broadcast devices, via a common user interface connected to the remotely located server, by modifying the configuration data.

16. The method of claim 15, wherein the configuration data further includes at least one of updated settings and a universal resource locator (URL).

17. The method of claim 11, wherein the plurality of string broadcast devices communicate with the processor using at least one of a Bluetooth connection and a USB connection.

18. The method of claim 11, wherein the each of the plurality of string broadcast devices perform the method comprising:
storing the configuration data received by the wireless broadcast device in a memory;
processing the configuration data and reconfiguring the one or more string broadcast devices; and
transmitting a message upon completion of being reconfigured and in accordance with the received configuration data.

19. The method of claim 11, wherein one or more of the string broadcast devices is deployed in a place of business and operable to transmit the message to one or more wireless stations of customers.

20. A wireless broadcast device, comprising:
a plurality of string broadcast devices transmitting a message to one or more wireless devices associated with a user; and
a network connected processor communicatively coupled to and controlling the plurality of string broadcast devices, the processor
receiving configuration data for one or more of the string broadcast devices and provided by a remotely located server, the configuration data including an updated to software or firmware to configure the one or more string broadcast devices based on a status of the non-network connected broadcast devices previously communicated to the remotely located server;
responsive to a configuration command received from a user via a user interface at the remotely located server, and without physical intervention of the non-network connected broadcast devices, configuring a respective one or more of the string broadcast devices to update the non-network connected broadcast devices based on the configuration data received from the remotely located server and previously communicated by the non-network connected broadcast devices; and
communicating changes to the remotely located server responsive to identified configuration changes in one or more of the string broadcast devices, the changes communicated via a report in the form of a web request initially sent from the one or more non-network connected broadcast devices.

\* \* \* \* \*